INVENTORS
James W. Jacobs
Byron L. Brucken
George B. Long
BY Frederick M. Ritchie
THEIR ATTORNEY INVENTORS
James W. Jacobs
Byron L. Brucken
George B. Long
BY
Frederick M. Ritchie
THEIR ATTORNEY INVENTORS
James W. Jacobs
Byron L. Brucken
George B. Long
BY
Frederick M. Ritchie
THEIR ATTORNEY

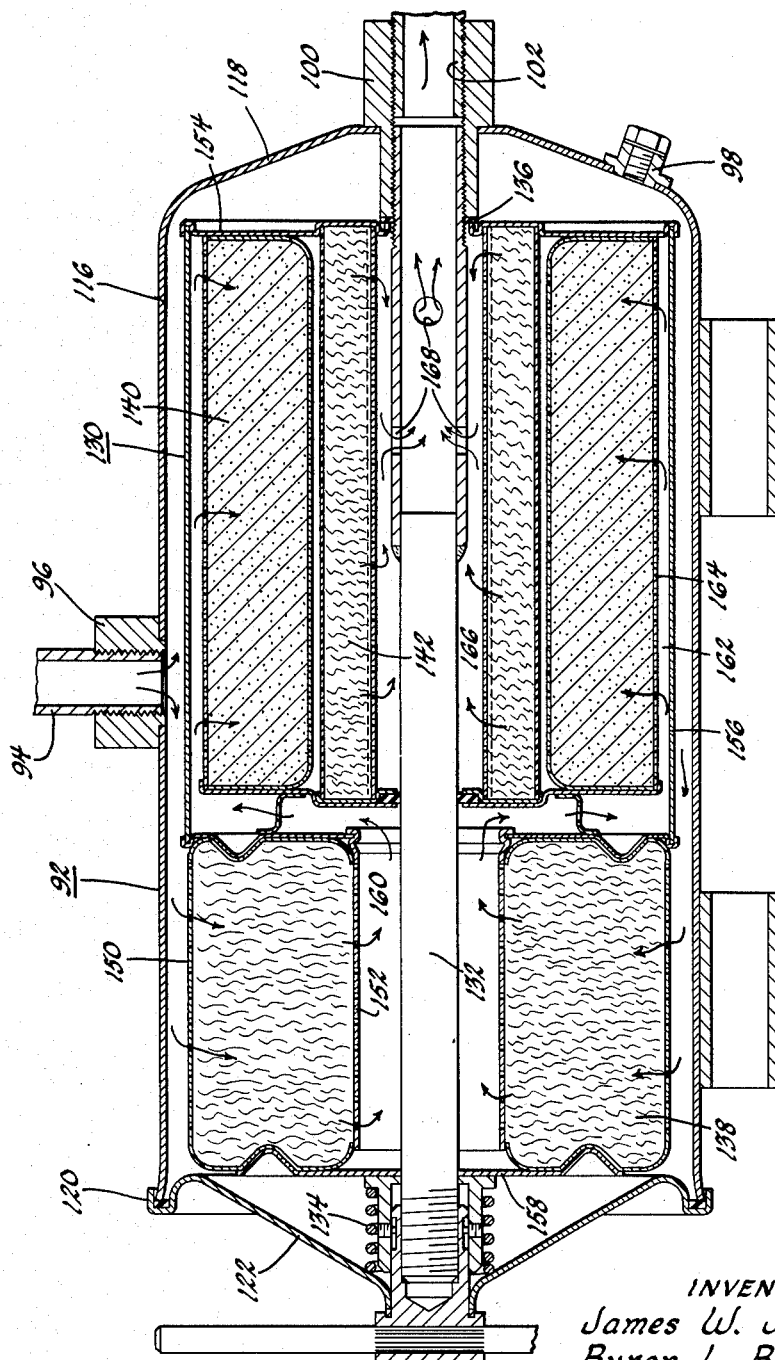

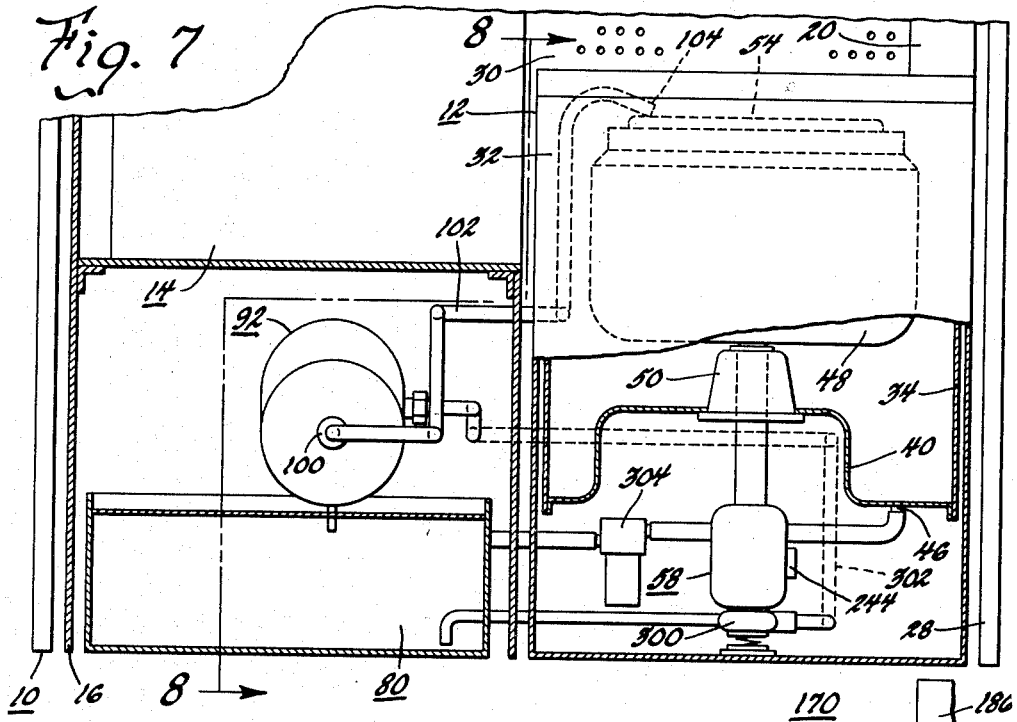
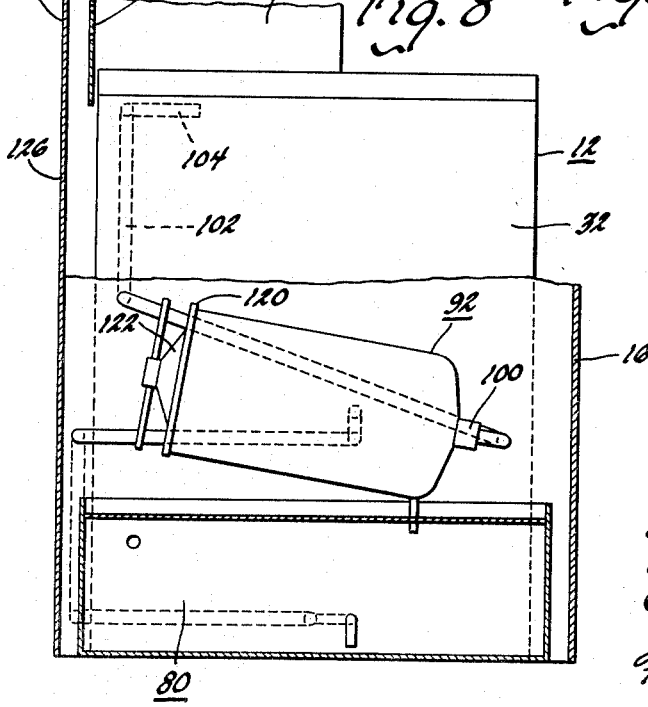
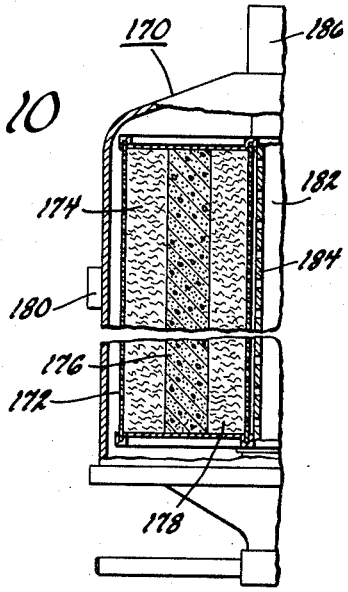

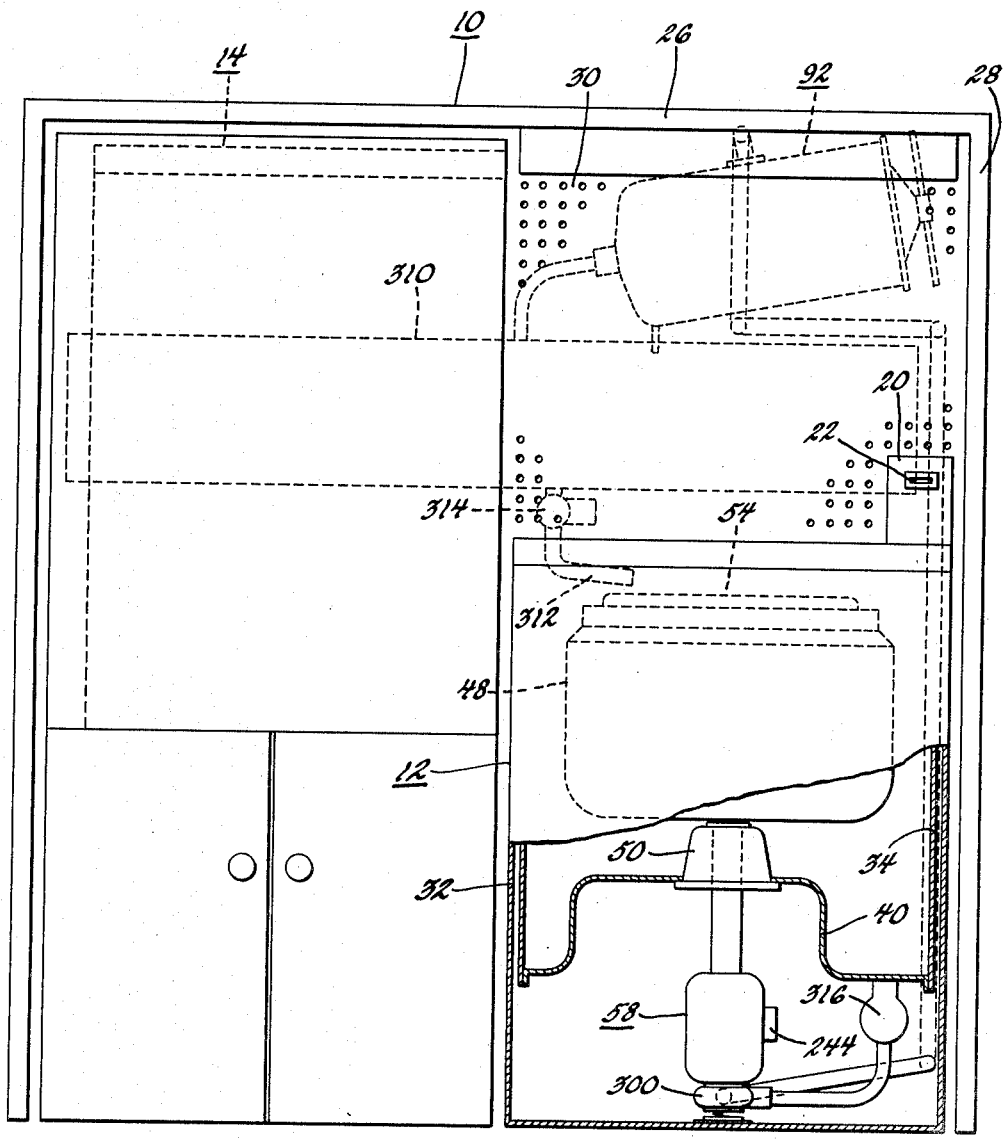

United States Patent Office 3,132,501
Patented May 12, 1964

---

3,132,501
DRY CLEANING SYSTEM WITH A REPLACEABLE FILTER CARTRIDGE AND MEANS FOR VENTING SOLVENT FUMES
James W. Jacobs, Byron L. Brucken, and George B. Long, Dayton, Ohio, assignors to General Motors Corporation, Detroit, Mich., a corporation of Delaware
Continuation of application Ser. No. 105,733, Apr. 26, 1961. This application May 27, 1963, Ser. No. 285,189
13 Claims. (Cl. 68—18)

This invention relates to a domestic appliance and more particularly to coin-operated dry cleaning systems. This application is a continuation of our copending application Serial No. 105,733, filed April 26, 1961, and now abandoned.

In the development of coin-operated dry cleaners, attention must be given to the users' safety as well as to the users' convenience in operating the equipment. A further concern with such coin-operated equipment is the maintenance thereof.

Accordingly, it is an object of this invention to provide a coin-operated dry cleaner system with a readily accessible replaceable cartridge type filter.

Another object of this invention is the provision of a dry cleaning system which includes a clothes washer having a vertically positioned spin tub in which the clothes are agitated while an overflow circulation of dry cleaning fluid is maintained.

Another object of this invention is the provision of a vent system for a dry cleaning system having independent agitating apparatus and drying apparatus, said vent system being operated whenever either of said agitating or drying apparatus is opened to the atmosphere.

Further objects and advantages of the present invention will be apparent from the following description, reference being had to the accompanying drawings wherein preferred embodiments of the present invention are clearly shown.

In the drawings:

FIGURE 5 is a sectional view of a replaceable filter suitable for use with this invention;

FIGURE 7 is a fragmentary sectional view, partly in elevation, of a second embodiment of this invention;

FIGURE 8 is a fragmentary sectional view, partly in elevation, taken along line 8—8 in FIGURE 7;

FIGURE 9 is a front elevational view, with parts broken away, of a third embodiment of this invention; and FIGURE 10 is a fragmentary sectional view, partly in elevation, of another form of filter suitable for use with this invention.

Figure 1:
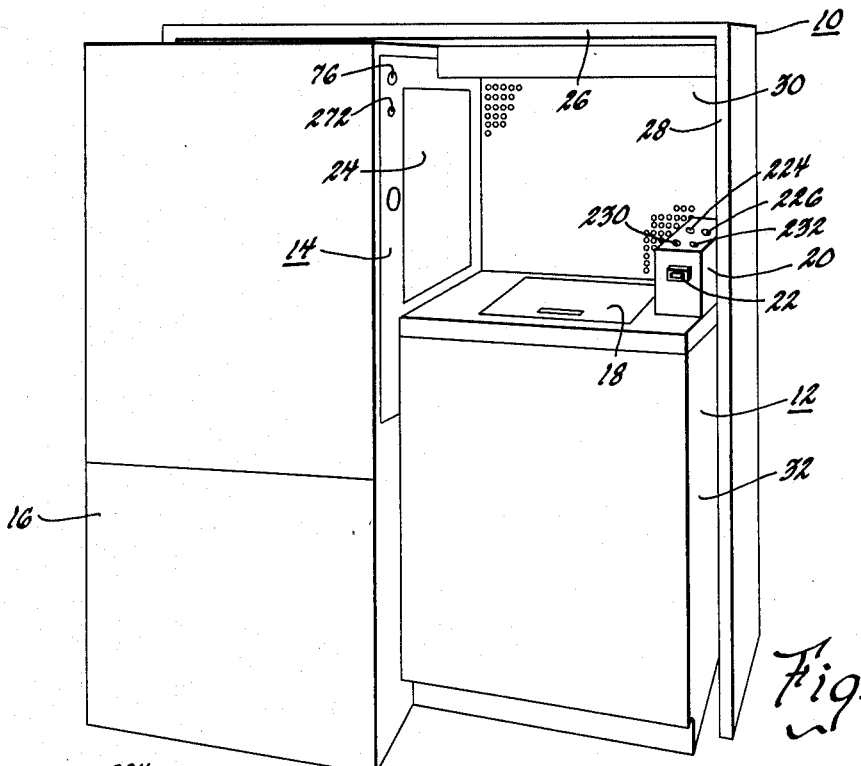
FIGURE 1 is a perspective front view of the coin-operated dry cleaning system of this invention.

In accordance with this invention and with reference to FIGURE 1, a coin-operated dry cleaning system is pictorially illustrated. The system includes an outer cabinet 10 for partially enclosing a clothes washer or agitating apparatus 12 and a clothes dryer or drying apparatus 14. Note that the clothes dryer 14 is elevated above the floor to provide for a filter compartment cabinet 16 therebelow. The clothes washer 12 has a top access door 18 which is pivotally openable for inserting and removing fabrics from the washer. A coin box 20 is positioned on the clothes washer and provided with a coin slot 22 through which the required fee is placed to condition the equipment for a complete dry cleaning cycle including washing and drying.

The clothes dryer 14 has a front access opening 24 which faces the washer access opening 18 adjacent one side thereof. This arrangement places the access doors 18 and 24 in a confined area defined by a top wall 26 and a sidewall 28 of the dry cleaning cabinet 10—a perforate grille 30 at the rear of the confined space operating to withdraw fumes from the area whenever either access door 18 or 24 is opened, as will be understood more fully hereinafter. The outlet or vent grille 30 is connected through a venting system at the rear of the cabinet to the atmosphere.

Figure 2:
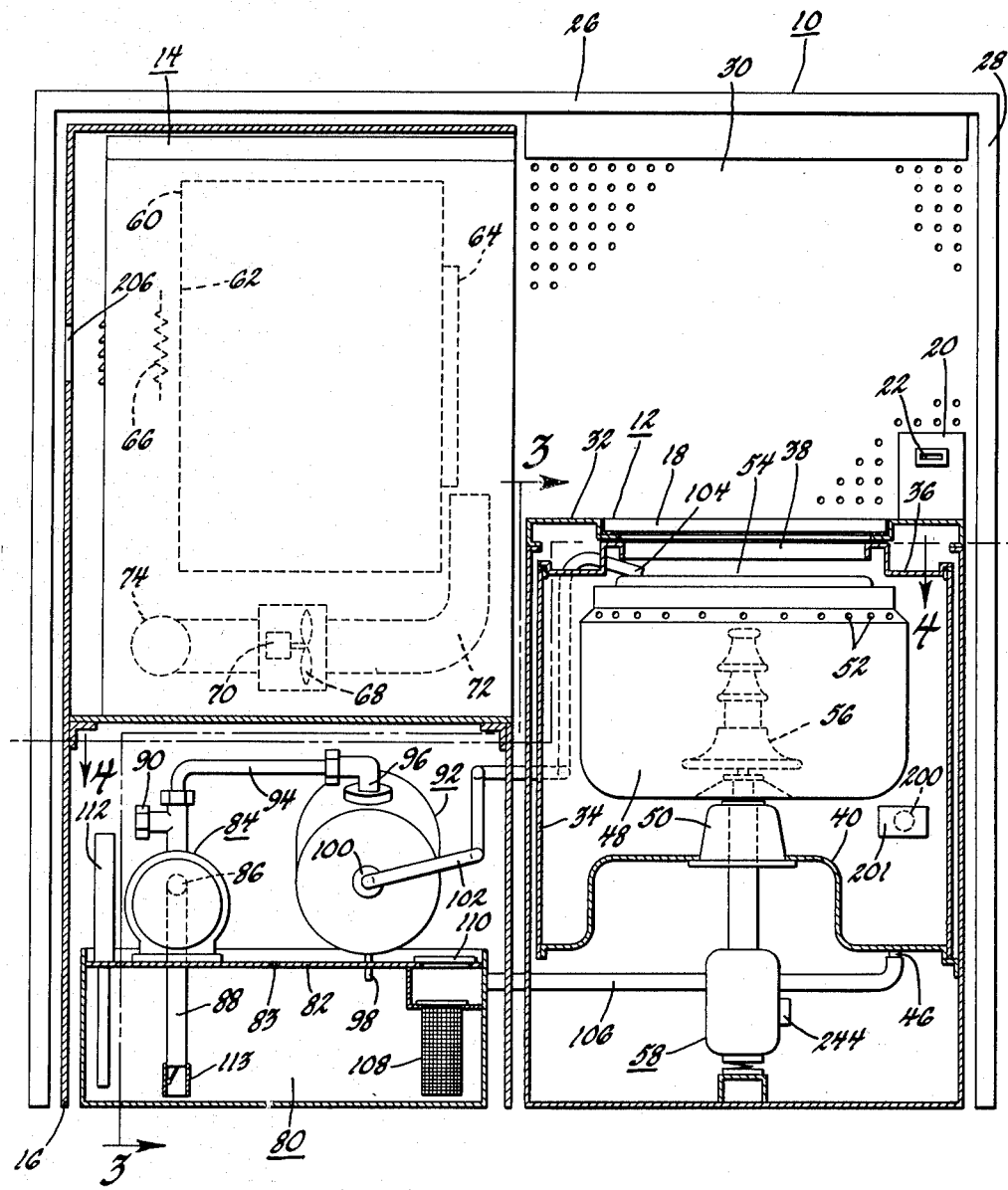
FIGURE 2 is a sectional view, partly in elevation, taken along line 2—2 in FIGURE 4.

Turning now to FIGURE 2, the washer or agitating apparatus 12 is shown comprised of an outer cabinet 32 in the top wall of which is located the access door 18 hinged along a rear edge thereof. Within the washer cabinet 32, a generally cylindrical imperforate solvent container 34 is disposed which includes a sub-top portion 36 having an access opening 38 in axial alignment with the top access lid 18 of the washer. A bulkhead 40 closes the lower end of the solvent container 34 and includes a drain opening 46 in a lowermost portion thereof. A generally cylindrical spin tub 48 is rotatably supported by a resilient inverted cup-like member 50 on the bulkhead 40 and includes a plurality of circumferentially arranged outflow ports 52 around an upper portion thereof. The tub 48 has a top access opening 54 which aligns with the openings 18 and 38 immediately above. Within the spin tub 48, an agitator 56 is adapted for vertical reciprocation. A motor driven agitating and spinning mechanism is shown generally at 58 and is adapted to actuate or vertically reciprocate the agitator 56 when operated in one manner and to rotate or spin the tub 48 when rotated in another manner. By way of suggesting one suitable agitating and spinning mechanism such as 58 but not by way limiting this invention, reference may be had to the patent to Clark, 2,422,395, issued June 17, 1947.

The clothes dryer 14 is a conventional single pass circulating air dryer substantially like that taught in the patent to Whyte, 2,843,945, issued July 22, 1958. The dryer includes a horizontally rotatable tumbling drum 60 having a perforate rear wall 62 and a front access opening 64 in alignment with the dryer door 24. A drying heater 66 is disposed adjacent the perforate rear wall 62 of the tumbling drum and adapted to be energized for drying clothes within the tumbling drum. During operation of the heater 66 and rotation of the tumbling drum 60, air is circulated by a fan shown generally at 68 driven by a motor 70 which may also be connected through a conventional pulley system for rotating the tumbling drum 60. The fan 68 is connected with the access opening 64 by way of a front duct 72, said front duct being exhausted by the fan through an exhaust duct 74 connected behind the dry cleaning cabinet to the outside vent system seen in FIGURE 4. The dryer includes a push button 76 (FIGURE 1) for initiating a predetermined drying cycle only after a wash cycle has been concluded—an interlock arrangement to be described more fully hereinafter serving to prevent the operation of the dryer unless there has first been a washing cycle.

Figure 3:
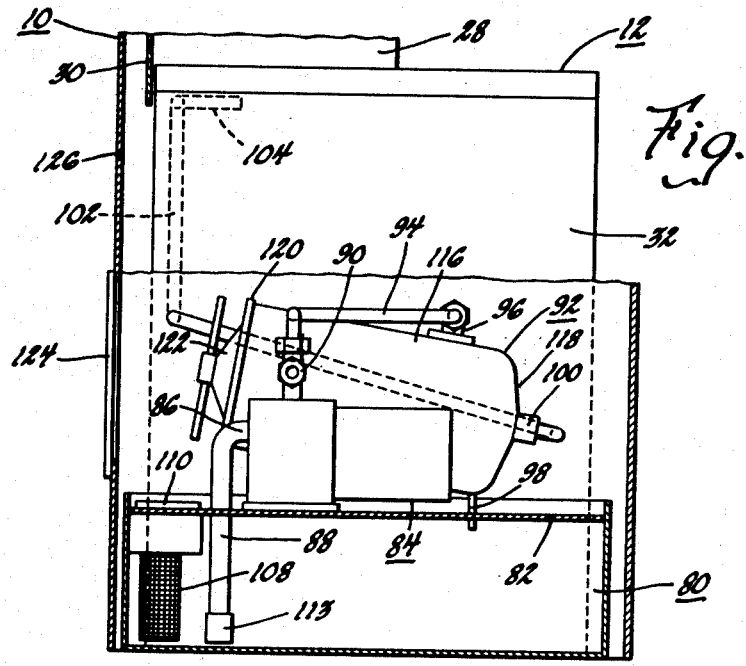
FIGURE 3 is a fragmentary sectional view, partly in elevation, taken along line 3—3 in FIGURE 2 to show the filter arrangement of this invention.
Figure 4:
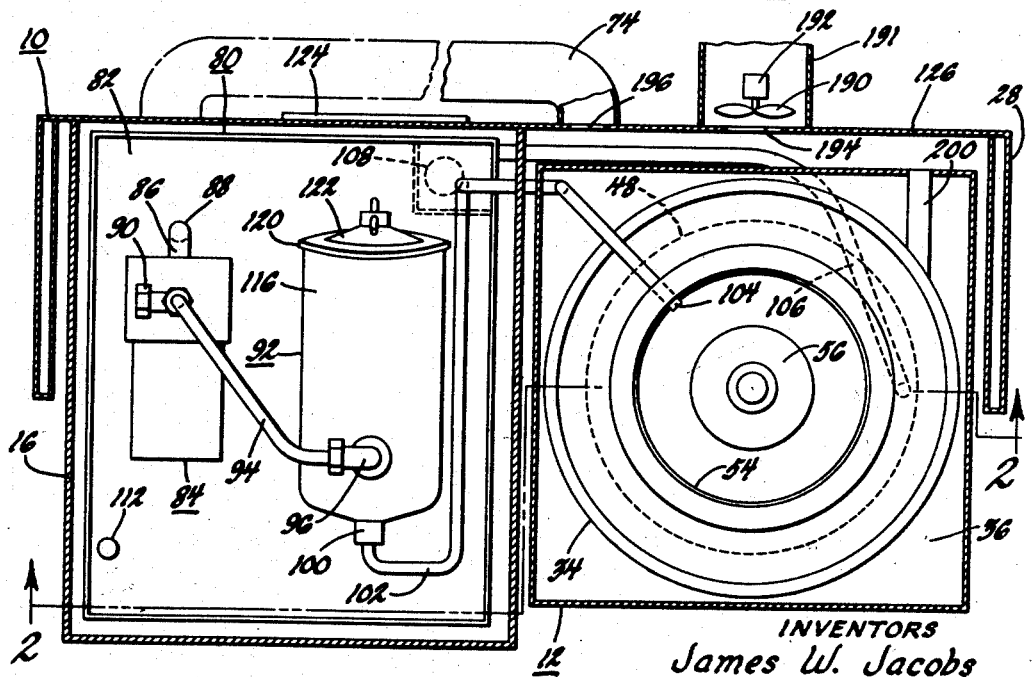
FIGURE 4 is a sectional view, partly in elevation, taken along line 4—4 in FIGURE 2.

The circulating system for a dry cleaning fluid or solvent, such as perchloroethylene (a somewhat toxic dry cleaning fluid) of Valclene (a non-toxic dry cleaning fluid which is essentially a fluorinated hydrocarbon such as Freon–113 made by the Du Pont Corporation) will now be described with reference to FIGURES 2, 3 and 4. The main components of the circulating system include a sump 80 having a top wall 82 with an air vent and spill-over return 83. Resting on the sump top wall 82 is a pump 84 which has its inlet 86 connected through a dip tube 88 to the bottom of the sump 80. A pressure valve 90 on the outlet side of the pump 84 indicates pressures in the system. A filter 92 is adapted to receive the output of the pump through a conduit 94 which connects to the inlet 96 of the filter. The filter 92 is positioned angularly in the filter compartment 16 such that an air bleed and gravity drain 98 extending through the sump wall 82 will drain the filter when the dry cleaning system is shut down. At one end of the filter, an outlet fitting 100 connects by way of a conduit 102 to the tub access opening 54—a terminal portion 104 of the conduit 102 overlying the top of the spin tub 48. Completing the circulating system is a conduit 106 which connects to the drain outlet 46 of the solvent container 34. This conduit 106 enters the sump 80 by way of a button trap 108, access to which is gained through a removable lid 110 for cleaning this trap device as well as for adding additional solvent to the system. A sight glass 112 or other suitable means may be used for providing a visual indication of the dry cleaning fluid level in the sump 80.

Since the system of this invention uses a pump which is operated only during the overflow wash, it is desirable to include a check valve 113 in the pump inlet line. By holding the supply piping full of solvent, air slugs will be prevented which could loosen the carbon from the filter and contaminate the solvent being pumped to the spin tub.

The fluid circulation system operates as follows. The pump 84 draws dry cleaning fluid or solvent from the sump 80 through the dip tube 88. This dry cleaning fluid, cleaned of large objects by the trap 108, is forced through the conduit 94 to the filter 92. The filter, which will be described more fully hereinafter, is effective to filter small solids, solubles and carbon from the dry cleaning fluid. The filtered dry cleaning fluid is then discharged from the filter by way of the conduit 102 and is discharged through the end 104 into the spin tub 48. When the level of dry cleaning fluid within the tub reaches the outflow ports 52, the dry cleaning fluid will overflow into the solvent container 34 and will return by gravity through the conduit 106 to the sump 80—the button trap 108 intercepting its flow to remove large objects from the fluid.

One of the basic concepts of this invention is found in the ease with which the filter 92 may be serviced. Note in FIGURE 3 that the filter is comprised of an outer shell or canister 116 having a closed end 118 and an openable end 120. The openable end is closed by a removable door 122 which is accessible through a service access door 124 on the rear wall 126 of the dry cleaner cabinet 10. Note also that the button trap 108 is accessible from this door as well.

The construction of the filter 92 is best seen in FIGURE 5 wherein the filter casing 116 is adapted to contain a re- movable throw-away filter element shown generally as 130. This throw-away element or filter cartridge 130 is retained in the filter casing 116 by the removable door or cover 122 which is retained to the casing through an adjustable shaft 132 threadedly engaged with the outlet fitting 100 at the closed end of the filter casing. A spring fitting 134 serves to maintain a constant bias on the replaceable element 130 to provide an effective seal of the filter element at its juncture 136 with the outlet of the filter casing.

The element 130 for processing the solvent is comprised of or contains an annular first stage 50% sisal–50% felt filter section 138 having approximately 145 square inches of face surface for removing particulate matter from the solvent, an annular second stage or carbon filter segment 140 having 300 to 400 square inches of face surface for conditioning the solvent by adsorbing dyes or the like, and an annular third stage folded cellulosic element such as a sisal and felt filter segment 142 within the filter segment 140 having approximately 1000 square inches of face surface.

Flow arrows in FIGURE 5 depict the path which the solvent pursues in passing through the filter. Contaminated dry cleaning fluid enters the filter casing 116 by way of the conduit 94 and the inlet fitting 96. The contaminated fluid flows first through the first stage filter 138 from its outer cylindrical wall 150 to its inner cylindrical wall 152. Note that the imperforate end wall 154, the imperforate cylindrical wall 156 and the imperforate end wall 158 channel the contaminated fluid first into the filter 138. After the first stage filter, the fluid enters the annular chamber 160 and flows as shown by the arrows into the annular chamber 162 between the throw-away casing 156 and a cylindrical perforated wall 164 defining the carbon filter segment 140. Leaving the carbon segment 140, the cleaning fluid filters through the element 142 into the annular central chamber 166 which leads by way of openings 168 to the outlet conduit 102. Note in FIGURE 5 that the bleed connection 98 is in a position to drain the filter casing 116 when the filter casing is mounted angularly.

Another embodiment of the filter is shown in FIGURE 10. In this arrangement a filter container 170 encloses a simple perforate throw-away element 172 wherein annular laminated layers of filtering material are formed by a first stage filtering material 174 of sisal and felt, a carbon layer 176 and a third stage sisal and felt layer 178. The dry cleaning fluid entering the cylinder 170 through the inlet fitting 180, flows radially inwardly from the outside of the element 172 to the outlet flow channel 182 through a cylindrical perforated wall 184 connected to an outlet fitting 186. In both the filters 92 and 170, the central filter element is designed to be expendable and is replaced as needed to keep the dry cleaning fluid in a satisfactorily uncontaminated condition. It is contemplated with the dry cleaning system of FIGURE 1 that the filter element or cartridge could be replaced at the end of each operating day or after approximately one hundred cleaning cycles. Such an arrangement is believed to eliminate the need for distilling or other reclaiming equipment, thereby considerably simplifying the operation of a dry cleaning plant.

Figure 6:
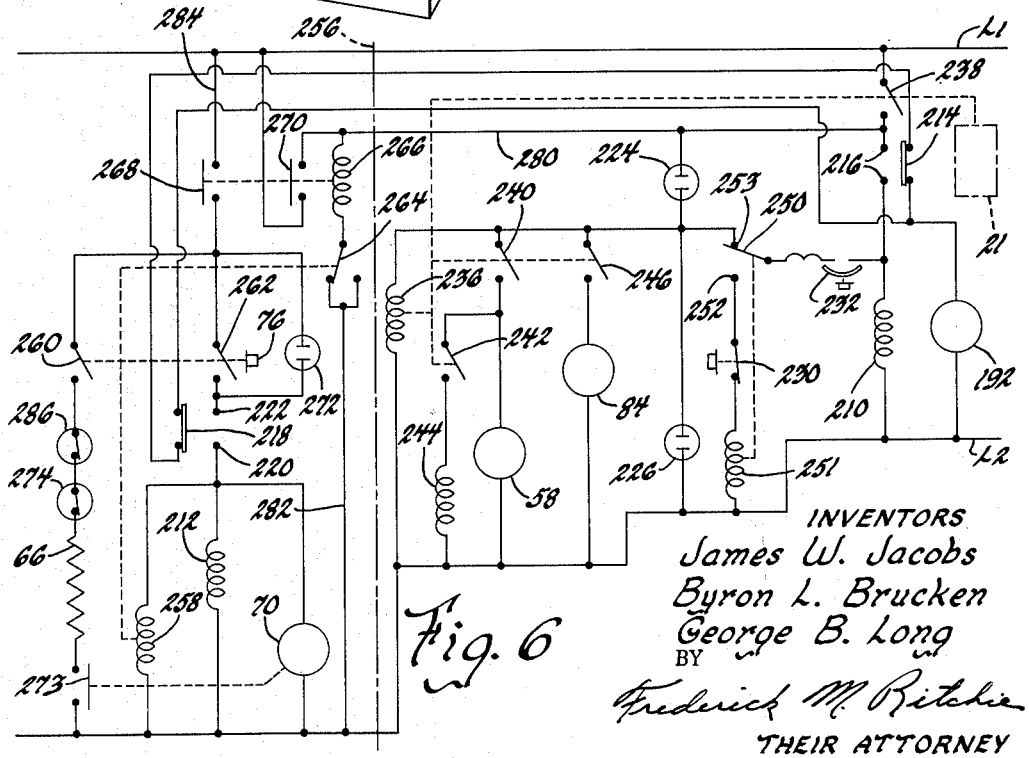
FIGURE 6 is a schematic wiring diagram for the control of this invention.

The operation of the dry cleaning system will be explained more fully with reference to FIGURE 6 wherein a schematic wiring diagram includes components suitable for safe operation of a coin-operated dry cleaning system. In addition to those components set forth hereinbefore, the operating system of this invention may include a vent fan 190 (FIGURE 4) operated by a fan motor 192. The fan 190 is connected through a vent outlet opening 194 in the rear wall 126 of the cabinet to the washer 12 and the dryer 14. More particularly, the dryer air duct system is connected through its exhaust conduit 74 to an opening 196 in the cabinet rear wall adjacent the clothes washer 12 and vent outlet 194. It is also desirable to vent solvent vapors from the solvent container 34 by way of an outlet duct 200 which is provided with a downwardly opening trap 201 for preventing liquid solvent from entering the vent system. Thus, whenever the fan motor 192 is energized, not only will the outlet grille 30 and evacuated cabinet 10 serve to withdraw vapors from the outer surfaces of the washer and dryer, but the interior of the washer and dryer cabinets will be vented as well. More particularly and with reference to the washer 12, when the lid 18 is opened, the vent fan 190 will draw vapors into the grille 30 as well as through the access opening 38 into the solvent container 34. From this latter location the solvent container will be swept clear of odors by way of the outlet duct 200 which is connected to the vent fan 190 and by way of the space between the rear walls of the cabinet 10 and the washer 12 (FIGURES 2 and 4). As will be understood more fully next following, the vent fan motor 192 is energized when either the dryer access door 24 or the washer access door 18 is opened.

To prevent the opening of the access doors during a cycle operation, a lid latch solenoid 210 is provided for actuating a conventional latch (not shown) to lock the washer access door 18 closed. Similarly, a dryer door latch solenoid 212 is operative to actuate another conventional latch (not shown) to lock positively the dryer door 24 in a closed position during dryer operation. In addition, the washer door 18 serves to manipulate a switch 214 to the position shown in FIGURE 6 whenever the lid is opened. Conversely, the switch 214 closes the contacts 216 when the door is closed. Also, the dryer door 24 actuates a dryer door switch 218 from the position shown in FIGURE 6 when the door is opened to a position wherein contacts 220, 222 are closed when the door 24 is closed. Indicating lights, such as an unbalance neon light 224 and a neon washer operating light 226, are exposed on top of the coin box 20, the former being used in conjunction with an unbalance reset button and switch assembly 230. An overload reset button and switch assembly 232 has its button portion accessible on the coin box to reset the motor overload switch portion in case the washer motor 58 cuts out an overload.

The operation of the washer 12 is controlled by a conventional pulsatingly advancing timer having a timer motor 236 which operates a plurality of cam actuated switch blades. More particularly, a main line switch 238 serves to energize the washer circuit and the clothes dryer interlock circuit, as will be described hereinafter. A timer switch 240 serves to energize the washer motor 58 when closed and a timer switch 242 serves to condition the agitate and spin mechanism for spin by energizing a spin solenoid 244 when both timer switches 240 and 242 are closed. A timer switch 246 selectively energizes the filter pump 84 to supply dry cleaning fluid to the spin tub 48 before the agitate cycle commenced and throughout the agitating portion of the cleaning cycle for providing an overflow cleaning period which is effective to float away the scum and lint from the surface of the cleaning fluid.

An unbalance switch 250 is tripped by the exaggerated movement of the spin tub 48 when it contains an out-of-balance load. Should an unbalance situation occur, the switch 250 will be moved to the contact 252 and the neon light 224 will light up to indicate an unbalance situation. This will energize a relay 251 to hold the switch blade 250 on the contact 252. After the unbalance is corrected manually, the unbalance reset button portion of the unbalance switch assembly 230 may be pushed to open the unbalance reset switch portion and drop out the unbalance switch 250 to the operating contact 253.

Generally speaking, the schematic wiring diagram to the right of the line 256 indicates that circuitry pertaining to the washer 12. That wiring circuitry to the left of the line 256 pertains to the dryer. More particularly, the dryer has a pulsatingly advancing timer with a motor 258 which operates a cam actuated switch 260 in the heater circuit, a switch 262 in the main supply circuit and an interrupt or dryer termination switch 264. The interlock between the washer and dryer circuitry is provided by a relay having an actuating coil 266 for operating a pair of switches 268 and 270. An indicating light, such as 272, is positioned on the front of the dryer 14 and adapted to indicate the conclusion of the drying cycle.

Suitable safety features, such as a motor speed switch 273 and a high limit thermostat 274, are included to provide for safe operation of the dryer.

In operation, the clothes washer lid 18 is opened and clothes are placed within the spin tub 48. Coins are placed within the coin box 20 to actuate the coin mechanism 21 so that the timer is indexed to close the timer contact switch 238. When the washer lid 18 is closed, the lid switch 214 moves to close the contacts 216 and energizes the latch solenoid 210 for positively retaining the door 18 closed. The operating neon light 226, is, thus, energized from L₁, switch 238, switch 214, contacts 216, and unbalance switch 250 to create a potential across the bulb 226. This circuitry also energizes the washer timer motor 236 which first acts to close the timer switch 246 and energize the filter pump motor 84. Solvent is pumped from the storage tank or sump 80 through the filter 92 into the spin tub 48. After a predetermined time interval, the timer switch 240 closes and starts the washer motor 58 to reciprocate the agitator 56 and wash the clothes. The solvent pump continues to operate during this wash period to cause solvent to overflow the wash tub through the overflow ports 52. This furnishes the spin tub 48 with a continuing supply of clean or uncontaminated solvent throughout the wash cycle and aids in washing away the lint and scum.

At the end of the wash cycle, timer switch 246 opens and timer switch 242 closes. This stops the filter pump and, thus, the circulation of solvent and the agitate and spinning mechanism 58 is conditioned through the energization of the spin solenoid 244 to rotate the spin tub 48. As the tub rotates, the dry cleaning solvent is centrifuged from the clothes through the outflow ports 52 into the solvent container 34 from which point it returns by gravity to the storage tank or sump 80. After a predetermined period of extraction as determined by the design of the washer timer, the timer motor 236 will open timer contacts 242, 238, 240 and 246, thereby terminating the washing cycle. Note that the check valve 113 will act to retain the supply piping full of solvent between agitated cycles so that only clean filtered solvent will be supplied to the tub 48.

The interlock arrangement of this invention is set up at the start of the wash cycle when the timer switch 238 is closed by the coin mechanism to energize the holding relay 266 as follows: from L₁ through the timer switch blade 238, the conductor 280, the holding coil solenoid 266, interrupt switch 264, conductor 282 to the other side of the line L₂. With the energization of the solenoid 266, the switches 268 and 270 are closed—the switch 270 setting up a holding circuit for the coil 266 which maintains the dryer 14 in condition for one drying cycle at the conclusion of a preceding wash cycle. At the conclusion of the wash cycle, the latch solenoid 210 is deenergized when the timer switch 238 is opened. Thus, the access door 18 may be opened to remove the clothes therefrom. Since the dryer start button 76 has not been depressed to close the timer switch 262, the dryer door latch solenoid 212 is deenergized and the dryer door 24 may be manually opened to receive the load of cleaned clothes in preparation for the drying cycle. As the dryer door 24 is closed, the door switch 218 moves to close the contacts 220 and 222. Thus, when the push button 76 is actuated, the dryer door latch solenoid 212, the dryer timer motor 258 and the dryer fan motor 70 are energized from L₁, line 284, relay switch 268, timer switch 262, door switch 218 and the operated components 70, 212 and 258 to the other side of the line. As soon as the drying cycle starts, the timer switch 260 is closed to energize the heater 66, assuming, of course, that the dryer motor 70 comes up to speed to close the motor speed safety switch 273. A temperature control thermostat, such as 286, is included in temperature sensitive relationship to the tumbling drum so that it can selectively energize the dryer heater 66 to mantain a predetermined temperature throughout the drying cycle. Heated air circulates over the clothes to dry them and is exhausted by way of the duct 74 into the vent system 191 to the atmosphere seen in FIGURE 4. At the end of the drying cycle, the timer motor 258 operates to move the timer switch 264, thereby opening the circuit to the holding coil 266 which then drops out the switch 268 to deenergize the dryer components and break the circuit across the indicating neon light 272. The light goes out to signal an end to the drying cycle.

Note in all operating situations the dry cleaning system is provided with a vent fan 192 which is energized irrespective of the timer control circuitry if either the washer door 18 or the dryer door 24 is opened. This permits the interior of the washer and dryer cabinets to be swept clear of any toxic vapors or fumes and effects a completely safe system for use in coin-operated establishments.

A second embodiment of this invention is shown in FIGURE 7 wherein similar components to those described hereinbefore are given the same reference numerals. In the FIGURE 7 arrangement, one motor is eliminated by using a pump 300 disposed below the agitate and spin mechanism 58 and operated thereby to withdraw solvent from the storage tank 80 and to deliver the contaminated solvent by way of a conduit 302 to the filter 92. A button trap 304 is disposed in the gravity drain leading from the solvent container 34 and, thus, a recirculating type overflow system is designed wherein a single motor is effective to operate both the agitating and spinning mechanism and the solvent circulating pump.

A third embodiment is seen in FIGURE 9 wherein the replaceable type filter element 92 is disposed near a top rear portion of the dry cleaner cabinet 10 to effect what may be termed a gravity dump system. In this arrangement the solvent sump or storage container 310 is disposed above the spin tub 48 and adapted to flow by gravity through a nozzle 312 into the tub. A solenoid actuated valve 314 is energized selectively to open the sump 310 to the spin tub 48. As in the second embodiment, a pump 300 is tied to the agitating and spinning actuating motor to draw fluid from the liquid container 34 through a button trap 316 and to pump the contaminated fluid through the filter 92 and back into the sump 310. In this system the storage tank holds all of the solvent at the start of a wash cycle. The fill valve is energized to dump the storage tank solvent into the washer. When a sufficient amount of solvent is in the washer tub, the washer mechanism and pump start to circulate the solvent overflowing the spin tub into the filter and return to the tank and tub on a continuous overflow wash basis. At the end of the wash cycle, the valve closes and all the solvents are stored in the tank again.

It should now be seen that an improved coin-operated dry cleaning system has been designed wherein a vertical tub is utilized for cleaning in conjunction with an overflow circulation of cleaning solvent. A readily accessible disposable filter is included in the system to provide for simplified maintenance. Safety features have been effected which provide for automatic ventilation whenever there is a possibility of exposure to solvent vapors and an interlock arrangement has been effected to permit dryer operation only after a preceding washer operation.

While the embodiments of the present invention as herein disclosed, constitute preferred forms, it is to be understood that other forms might be adopted.

What is claimed is as follows:

1. In combination, a clothes agitating apparatus having a vertical spin tub, an agitator in said tub and means for reciprocating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening, means forming a filter compartment adjacent said agitating apparatus and beneath said clothes dryer, said filter compartment enclosing a sump having a button trap, an angularly disposed filter chamber having a lower closed end and a selectively openable service access end facing rearwardly, a replaceable filter cartridge in said chamber, a pump having a flow inlet conduit connected to said sump and an outlet conduit connected to the top of said filter chamber, a supply conduit connecting the lower closed end of said filter to said spin tub, return conduit means connecting the solvent container to said sump through said button trap, whereby solvent is adapted for circulation from said sump through said filter to said spin tub for centrifugal release to said solvent container and gravity return to said sump, frontwardly opening enclosure means for partially enclosing said agitating apparatus, said clothes dryer and said filter compartment to form a unitary dry cleaning system, said enclosure means including a vent inlet grille adjacent said top opening and said access door for venting solvent fumes, a vent fan connected to said grille, means for energizing said vent fan whenever either of said dryer access door or said agitating apparatus top opening is opened, and control means for conditioning said clothes dryer for a drying cycle when said clothes agitating apparatus is energized for dry cleaning and for energizing said pump to effect a continuous flow of solvent to said spin tub while said reciprocating and spinning means is energized for reciprocating said agitator.

2. In combination, a clothes agitating apparatus having a vertical spin tub, an agitator in said tub and means for reciprocating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening, means forming a filter compartment adjacent said agitating apparatus and beneath said clothes dryer, said filter compartment enclosing a sump having a button trap, an angularly disposed filter chamber having a lower closed end and a selectively openable service access end facing rearwardly, a pump having a flow inlet conduit connected to said sump and an outlet conduit connected to the top of said filter chamber, a supply conduit connecting the lower closed end of said filter to said spin tub, return conduit means connecting the solvent container to said sump through said button trap, whereby solvent is adapted for circulation from said sump through said filter to said spin tub for centrifugal release to said solvent container and gravity return to said sump, frontwardly opening enclosure means for partially enclosing said agitating apparatus, said clothes dryer and said filter compartment to form a unitary dry cleaning system, said enclosure means including a vent inlet grille adjacent said top opening and said access door for venting solvent fumes, a vent fan connected to said grille, and means for energizing said vent fan whenever either of said dryer access door or said agitating apparatus top opening is opened.

3. In combination, a clothes agitating apparatus having a vertical spin tub, an agitator in said tub and means for reciprocating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening, means forming a filter compartment adjacent said agitating apparatus and beneath said clothes dryer, said filter compartment enclosing a sump having a button trap, an angularly disposed filter chamber having a lower closed end and a selectively openable service access end facing rearwardly, a replaceable filter cartridge in said chamber, a pump having a flow inlet conduit connected to said sump and an outlet conduit connected to the top of said filter chamber, a supply conduit connecting the lower closed end of said filter to said spin tub, return conduit means connecting the solvent container to said sump through said button trap, whereby solvent is adapted for circulation from said sump through said filter to said spin tub for centrifugal release to said solvent container and gravity return to said sump, frontwardly opening enclosure means for partially enclosing said agitating apparatus, said clothes dryer and said filter compartment to form a unitary dry cleaning system, said enclosure means including a vent inlet grille adjacent said top opening and said access door for venting solvent fumes, a vent fan connected to said grille, and means for energizing said vent fan whenever either of said dryer access door or said agitating apparatus top opening is opened.

4. In combination, a clothes agitating apparatus having a vertical spin tub, an agitator in said tub and means for actuating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening, means forming a filter compartment adjacent said agitating apparatus and beneath said clothes dryer, said filter compartment enclosing a sump, means forming a filter chamber having a closed end and a selectively openable service access end, a replaceable filter cartridge insertable through said service access end into said chamber, a pump having an inlet conduit connected to said sump and an outlet conduit connected to said filter chamber on one side of said filter cartridge, a supply conduit connecting said filter chamber on the other side of said filter cartridge to said spin tub, return conduit means connecting the solvent container to said sump, whereby solvent is adapted for circulation from said sump through said filter cartridge to said spin tub for centrifugal release to said solvent container and gravity return to said sump, enclosure means for partially enclosing said agitating apparatus, said clothes dryer and said filter compartment to form a unitary dry cleaning system, said enclosure means including a vent inlet grille adjacent said top opening and said access door for venting solvent fumes, a vent fan connected to said grille, and means for energizing said vent fan when either of said dryer access door or said agitating apparatus top opening is opened.

5. In combination, a clothes agitating apparatus having a vertical spin tub, an agitator in said tub and means for actuating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening adjacent one side thereof, means forming a filter compartment adjacent said agitating apparatus and beneath said clothes dryer, said filter compartment enclosing a sump, means forming a filter chamber having a closed end and a selectively openable service access end, a permanently unitary replaceable filter cartridge insertable through said service access end into said chamber, said cartridge including a plurality of filtering stages in permanently fixed relationship to each other, a pump having an inlet conduit connected to said sump and an outlet conduit connected to said filter chamber on one side of said filter cartridge, a supply conduit connecting said filter chamber on the other side of said filter cartridge to said spin tub, return conduit means connecting the solvent container to said sump, whereby solvent is adapted for circulation from said sump through said filter cartridge to said spin tub for centrifugal release to said solvent container and gravity return to said sump, and enclosure means partially enclosing said agitating apparatus, said clothes dryer and said filter compartment in a manner to place said top access opening and said access door in a confined area and to form a unitary dry cleaning system.

6. The combination of claim 5 wherein said replaceable filter cartridge comprises means forming a single disposable shell enclosing means forming a first filter stage for removing particulate matter from said solvent and means forming a second filter stage for conditioning said solvent.

7. The combination of claim 6 wherein said first filter stage includes sisal and felt and said second filter stage includes carbon.

8. In combination, a clothes agitating apparatus having a vertical spin tub, an agitator in said tub and means for actuating said agitator and spinning said tub, said agitating apparatus including a solvent container for enclosing said agitator and said spin tub and having a top access opening, a clothes dryer adjacent said agitating apparatus and having a tumbling drum and a cabinet for enclosing said tumbling drum, said cabinet having an access door above and facing said top access opening, means forming a filter compartment enclosing a sump having a button trap, an angularly disposed filter chamber having a lower closed end and a selectively openable service access end facing toward the outside of said filter compartment and having a filter chamber inlet and a filter chamber outlet, a replaceable filter cartridge in said filter chamber, a pump having a flow inlet conduit connected to said sump and an outlet conduit connected to said filter chamber inlet, a supply conduit connecting said filter chamber outlet to said spin tub, return conduit means connecting the solvent container to said sump through said button trap, whereby solvent is adapted for circulation from said sump through said filter to said spin tub for centrifugal release to said solvent container and gravity return to said sump, frontwardly opening enclosure means for partially enclosing said agitating apparatus, said clothes dryer and said filter compartment to form a unitary dry cleaning system, said enclosure means including a vent inlet grille adjacent said top opening and said access door for venting solvent fumes, a vent fan connected to said grille, and means for energizing said vent fan whenever either of said dryer access door or said agitating apparatus top opening is opened.

9. In combination, a clothes agitating apparatus having a vertical spin tub, an agitator in said tub and means for actuating said agitator and spinning said tub, said agitating apparatus including a solvent container for enclosing said agitator and said spin tub and having a top access opening, a clothes dryer adjacent said agitating apparatus and having a horizontally rotatable tumbling drum and a cabinet for enclosing said tumbling drum, said cabinet having an access door above and facing said top access opening adjacent one side thereof, means forming a filter compartment adjacent said agitating apparatus and beneath said clothes dryer, said filter compartment enclosing a sump, means forming a filter chamber having a closed end and a selectively openable service access end, a permanently unitary replaceable filter cartridge insertable through said service access end into said chamber, said cartridge including a plurality of filtering stages in permanently fixed relationship to each other, inlet conduit means connecting said sump to said filter chamber on one side of said filter cartridge, supply conduit means connecting said filter chamber on the other side of said filter cartridge to said spin tub, pump means connected in pumping relationship to said inlet conduit means and said supply conduit means in a manner to effect flow from said inlet conduit means through said filter cartridge to said supply conduit means, return conduit means connecting the solvent container to said sump, whereby solvent is adapted for circulation from said sump through said filter cartridge to said spin tub for centrifugal release to said solvent container and gravity return to said sump, and enclosure means partially enclosing said agitating apparatus, said clothes dryer and said filter compartment in a manner to place said top access opening and said access door in a confined area and to form a unitary dry cleaning system.

10. In combination, a clothes cleaning apparatus having a vertical spin tub and means for agitating in said tub and spinning said tub, said cleaning apparatus including a solvent container for enclosing said spin tub and having a top access opening, a clothes dryer adjacent said cleaning apparatus having a rotatable tumbling drum and an access door to said tumbling drum above said top access opening and adjacent one side thereof, means forming a filter compartment adjacent said cleaning apparatus and said clothes dryer and enclosing a sump, means forming a filter chamber having a closed end and a selectively openable service access end, a permanently unitary replaceable filter cartridge insertable through said service access end into said chamber, said cartridge including a plurality of filtering stages in permanently fixed relationship to each other, inlet conduit means connecting said sump to said filter chamber on one side of said filter cartridge, supply conduit means connecting said filter chamber on the other side of said filter cartridge to said spin tub, pump means connected in pumping relationship to said inlet conduit means and said supply conduit means in a manner to effect flow from said inlet conduit means through said filter cartridge to said supply conduit means, return conduit means connecting the solvent container to said sump, whereby solvent is adapted for circulation from said sump through said filter cartridge to said spin tub for centrifugal release to said solvent container and gravity return to said sump and enclosure means partially enclosing said cleaning apparatus, said clothes dryer and said filter compartment in a manner to place said top access opening and said access door in a confined area and to form a unitary dry cleaning system.

11. In combination, a clothes cleaning apparatus having a vertical spin tub and means for agitating in said tub and spinning said tub, said cleaning apparatus including a solvent container for enclosing said spin tub and having a top access opening, a clothes dryer adjacent said cleaning apparatus having a rotatable tumbling drum and an access door to said tumbling drum above said top access opening and adjacent one side thereof, means forming a filter compartment adjacent said cleaning apparatus and said clothes dryer and enclosing a sump, means forming a filter chamber having a closed end and a selectively openable service access end, a permanently unitary replaceable filter cartridge insertable through said service access end into said chamber, said cartridge including a plurality of filtering stages in permanently fixed relationship to each other, inlet conduit means connecting said sump to said filter chamber on one side of said filter cartridge, supply conduit means connecting said filter chamber on the other side of said filter cartridge to said spin tub, pump means connected in pumping relationship to said inlet conduit means and said supply conduit means in a manner to effect flow from said inlet conduit means through said filter cartridge to said supply conduit means, and return conduit means connecting the solvent container to said sump, whereby solvent is adapted for circulation from said sump through said filter cartridge to said spin tub for centrifugal release to said solvent container and gravity return to said sump.

12. The combination of claim 11 wherein said replaceable filter cartridge comprises means forming a single disposable shell enclosing means forming a first filter stage for removing particulate matter from said solvent and means forming a second filter stage for conditioning said solvent.

13. The combination of claim 12 wherein said first filter stage includes a folded cellulosic element and said second filter stage includes carbon.

References Cited in the file of this patent
UNITED STATES PATENTS

| | | |
|---|---|---|
| 1,602,705 | Riley et al. | Oct. 12, 1926 |
| 1,917,096 | Chamberlin | July 4, 1933 |
| 2,144,157 | Jorgenson | Jan. 17, 1939 |
| 2,329,356 | Moore | Sept. 14, 1943 |
| 2,601,404 | Lasky | June 24, 1952 |
| 2,793,652 | Evans | May 28, 1957 |
| 2,833,137 | Geldhof | May 6, 1958 |
| 2,841,003 | Conlee | July 1, 1958 |
| 2,881,609 | Brucken | Apr. 14, 1959 |
| 2,932,961 | Robbins et al. | Apr. 19, 1960 |